United States Patent [19]

Cutler et al.

[11] Patent Number: 5,341,482
[45] Date of Patent: Aug. 23, 1994

[54] METHOD FOR SYNCHRONIZATION OF ARITHMETIC EXCEPTIONS IN CENTRAL PROCESSING UNITS HAVING PIPELINED EXECUTION UNITS SIMULTANEOUSLY EXECUTING INSTRUCTIONS

[75] Inventors: David N. Cutler, Bellevue; David A. Orbits, Redmond, both of Wash.; Dileep Bhandarkar, Shrewsbury, Mass.; Wayne Cardoza, Merrimack, N.H.; Richard T. Witek, Littleton, Mass.

[73] Assignee: Digital Equipment Corporation, Maynard, Mass.

[21] Appl. No.: 995,341

[22] Filed: Dec. 22, 1992

Related U.S. Application Data

[63] Continuation of Ser. No. 541,148, Jun. 20, 1990, abandoned, which is a continuation of Ser. No. 373,662, Jun. 27, 1989, abandoned, which is a continuation of Ser. No. 28,248, Mar. 20, 1987, abandoned.

[51] Int. Cl.[5] .......................... G06F 9/30; G06F 9/34; G06F 13/376; G06F 9/38
[52] U.S. Cl. ................... 395/375; 364/230.6; 364/239; 364/242; 364/261.6; 364/261.7; 364/262.4; 364/262.8; 364/262.9; 364/263.1; 364/263.3; 364/265.6; 364/268.4; 364/268.6; 364/271.5; 364/275.8; 364/281.5; 364/271.9; 364/DIG. 1; 364/DIG. 2
[58] Field of Search ............... 395/800, 550, 500, 200, 395/425, 775, 700, 650, 375, 250, 275, 325, 575, 400, 725; 364/DIG. 1, DIG. 2, 748

[56] References Cited

U.S. PATENT DOCUMENTS

| | | | |
|---|---|---|---|
| 3,553,654 | 1/1971 | Crane | 395/575 |
| 3,696,340 | 10/1972 | Matsushita et al. | 395/575 |
| 3,700,874 | 10/1972 | Heightley | 364/736 |
| 4,021,655 | 5/1977 | Healey et al. | 395/375 |
| 4,161,031 | 7/1979 | Olander, Jr. et al. | 364/DIG. 1 |
| 4,338,675 | 7/1982 | Palmer et al. | 364/DIG. 1 |
| 4,379,338 | 4/1983 | Nishitani et al. | 364/745 |

FOREIGN PATENT DOCUMENTS 528849 5/1983 Australia.
1092714 12/1980 Canada.

OTHER PUBLICATIONS

Siewiovek, "Intel Microprocessors: 8008 to 8086", *Computer Structures: Principles and Examples*, Chapter 37, pp. 623–633 (1990).

(List continued on next page.)

*Primary Examiner*—Alyssa H. Bowler
*Assistant Examiner*—Daniel H. Pan
*Attorney, Agent, or Firm*—Fish and Richardson

[57] ABSTRACT

An instruction eases exception handling in a data processing system having one or more parallel pipelined execution units by permitting the central processing unit to complete instructions currently being processed by the execution units, but preventing further instructions from being initiated until all currently executing instructions have been completed and all outstanding exception conditions have been resolved. After all the instructions preceding the DRAIN instruction of the present invention in the program instruction sequence have been executed, the central processing unit can continue to execute the sequential program instructions when no arithmetic exception has been identified, or can invoke an exception handling procedure when an arithmetic exception has been identified. The instruction is typically positioned in an instruction sequence after an instruction that has high degree of probability of resulting in the identification of an arithmetic exception condition. The DRAIN instruction permits the source of the exception to be localized and permits the response to all arithmetic exceptions associated with instructions initiated before the DRAIN instruction, but identified after the execution of the DRAIN instruction, to be handled in the same context environment in which the instruction was initiated.

27 Claims, 4 Drawing Sheets

U.S. PATENT DOCUMENTS

| | | | |
|---|---|---|---|
| 4,429,370 | 1/1984 | Blau et al. | 364/748 |
| 4,443,849 | 4/1984 | Ohwada | 395/575 |
| 4,484,259 | 11/1984 | Palmer et al. | 364/754 |
| 4,589,065 | 5/1986 | Auslander et al. | 364/200 |
| 4,608,688 | 8/1986 | Hansen et al. | 371/11.3 |
| 4,622,650 | 11/1986 | Kulisch | 364/748 |
| 4,641,305 | 2/1987 | Joyce et al. | 371/12 |
| 4,715,013 | 12/1987 | MacGregor et al. | 364/900 |
| 4,755,966 | 7/1988 | Lee et al. | 395/375 |
| 4,760,519 | 7/1988 | Papworth | 395/375 |
| 4,773,035 | 9/1988 | Lee et al. | 364/748 |
| 4,788,655 | 4/1988 | Nakayama et al. | 364/748 |
| 4,797,816 | 1/1989 | Uchiyama et al. | 395/400 |
| 4,817,048 | 3/1989 | Rawlinson et al. | 364/761 |
| 4,823,256 | 4/1989 | Bishop et al. | 395/575 |
| 4,853,840 | 8/1989 | Shibuya | 395/375 |
| 4,879,676 | 11/1989 | Hansen | 364/748 |

OTHER PUBLICATIONS

Motorola, "MC68020 32-Bit Microprocessor User's Manual", pp. A-1, A-2, A-3, A-4, B-3, B-5, B-61, B-62, B-165, 6-5, 6-6, 6-7, 6-8, 6-10, 6-20, 6-21, and 9-28, (1985).

Przybylski, "Organization and VLSI Implementation of MIPS," *Journal of VLSI and Computer Systems*, vol. 1, No. 2, pp. 170-209 (1984).

Smith, "Implementation of Precise Interrupts in Pipelined Processors," *The 12th Annual International Symposium on Computer Architecture*, pp. 36-44 (1985).

David A. Patterson, John L. Hennessey; Computer Architecture A Quantitative Approach; 1990; pp. 214-216.

METHOD FOR SYNCHRONIZATION OF ARITHMETIC EXCEPTIONS IN CENTRAL PROCESSING UNITS HAVING PIPELINED EXECUTION UNITS SIMULTANEOUSLY EXECUTING INSTRUCTIONS

This is a continuation of application Ser. No. 07/541,148, filed Jun. 20, 1990 now abandoned, which is a continuation of Ser. No. 07/373,662, filed Jun. 27, 1989 (now abandoned), which is a continuation of Ser. No. 07/028,248, filed Mar. 20, 1987 (now abandoned).

RELATED APPLICATIONS

This application is related to the following Patent Applications, all of which were filed in the U.S. Patent and Trademark Office.

APPARATUS AND METHOD FOR RECOVERING FROM MISSING PAGE FAULTS IN VECTOR DATA PROCESSING OPERATIONS invented by David N. Cutler, David A. Orbits, Dileep Bhandarkar, Wayne Cardoza and Richard T. Witek; having Ser. No. 07/069,372; filed on Jul. 01, 1987, now U.S. Pat. No. 5,063,497, and assigned to the assignee of the present U.S. Patent Application.

APPARATUS AND METHOD FOR PROVIDING AN EXTENDED PROCESSING ENVIRONMENT FOR NON-MICROCODED DATA PROCESSING SYSTEMS invented by David N. Cutler, David A. Orbits, Dileep Bhandarkar, Wayne Cardoza and Richard T. Witek; having Ser. No. 07,069,365; filed on Jul. 01, 1987, now abandoned and assigned to the assignee of the present U.S. Patent Application.

BACKGROUND OF THE INVENTION

1. Field of the Invention

This invention relates generally to data processing systems and more particularly to data processing systems in which the system architecture permits parallel execution of a plurality of instructions.

During the operation of the data processing system, events can occur within the system that require the execution of an instruction sequence that is outside the explicit activity required for the completion of the currently executing program. When the events are relevant primarily to the currently executing program, the system response typically is to invoke a software program which is executed in the same context as the current program. The notification of such an event is termed an exception. When the event is primarily relevant to other software programs or to the system as a whole, the response must be processed in a system-wide context. The notification of this latter type event is termed an interrupt. This invention relates to a set of exceptions referred to as scalar arithmetic exceptions, vector arithmetic exceptions, scalar memory management exceptions and vector memory management exceptions.

2. Description of the Related Art

In order to achieve high performance in a data processing system, one technique is to provide apparatus for executing a plurality of instructions in parallel (i.e., instructions whose execution overlap in time). However, when one or more of the currently executing instructions results in a memory management exception or an arithmetic exception, such as an integer overflow, exponent overflow or underflow, etc, the determination of the exact location of the instruction that produced the exception can be extremely difficult. In addition, the diversity of possible exception origins complicates the creation of a software environment for efficiently responding to the exceptions.

Computer architectures, such as the DEC VAX data processing systems and the IBM System/370 data processing systems respond to an exception by aborting all instructions that were initiated after the first instruction to signal an exception condition. For a multiplicity of reasons, such as the differences in instruction execution speed, this technique is difficult to implement in the parallel execution of multiple instructions environment.

Other high performance data processing architectures, such as the CDC-7600 data processing system and the Cray-1, Cray-XMP and the Cray-2 data processing systems simply stop executing instructions at a convenient point in the program environment and provide no method for identifying instructions that signalled an exception condition. In addition, these architectures provide no mechanism for synchronizing the instruction execution with an environment created to respond to the identification of an exception.

A need has therefore been felt for m technique to provide a systematic response to the identification of and response to arithmetic exceptions and memory management exceptions in a data processing unit that can have a plurality of instructions in simultaneous execution.

FEATURES OF THE INVENTION

It is an object of the present invention to provide an improved data processing unit.

It is a feature of the present invention to provide an improved data processing system in which multiple instructions can be in simultaneous execution.

It is yet another feature of the present invention to provide an instruction that permits the completion of the instructions currently in execution.

It is a still further feature of the present invention to provide an instruction that assists in providing a synchronized response to arithmetic exceptions in the data processing system environment wherein a plurality of instructions can be in simultaneous execution.

SUMMARY OF THE INVENTION

The aforementioned and other features are accomplished, according to the present invention, by providing an instruction, hereinafter referred to as the DRAIN instruction, and apparatus supporting that instruction, that permits all instructions for which execution has been initiated, but has not been completed when the DRAIN instruction is initiated, to be completed before further instructions can be executed in the data processing system. The invention also provides for an arithmetic exception summary mask for scalar and vector registers that designates which registers received exceptional results. The DRAIN instruction is used to respond to the detection of an arithmetic exception within the data processing context environment in which the exception has been identified. The same arithmetic exception within a different data processing context environment can have different implications.

These and other features of the present invention will be understood upon reading of the following description along with the drawings.

DESCRIPTION OF THE PREFERRED EMBODIMENT

1. Detailed Description of the Figures

Figure 1A:
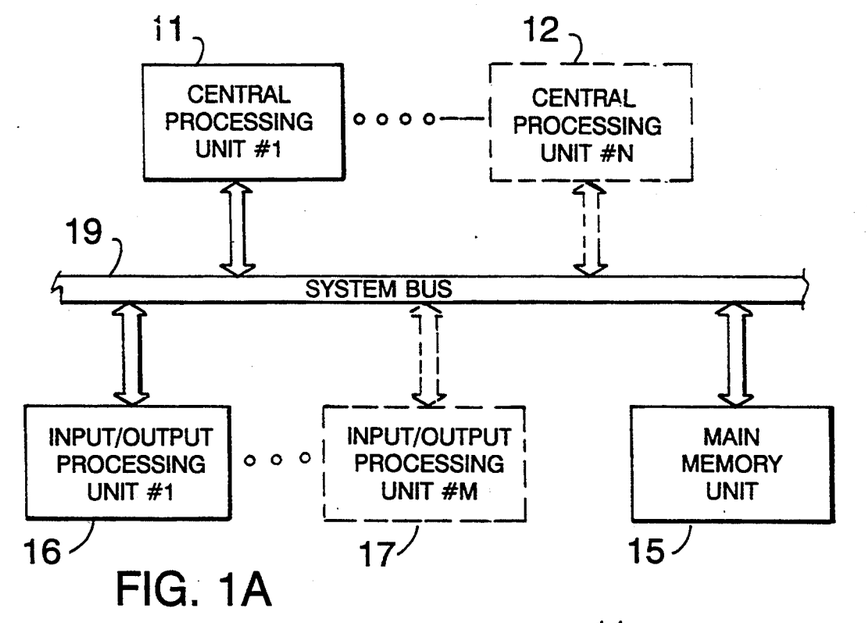
FIG. 1A and FIG. 1B are block diagrams of exemplary data processing system configurations capable of utilizing the present invention.
Figure 1B:
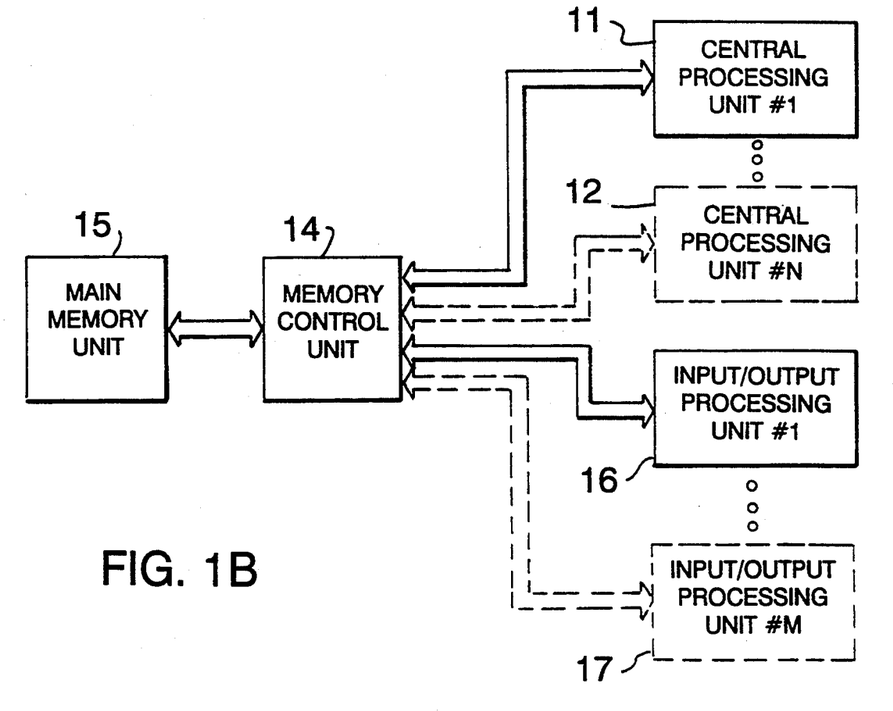

Referring now to FIG. 1A and FIG. 1B, two exemplary data processing system configurations capable of using the present invention are shown. In FIG. 1A, the central processing unit (#1) 11 is coupled to a system bus 19. Other central processing units (e.g., #N) 12 can also be coupled to the system bus 19. The central processing unit(s) 11 (through 12) process data according to the structure of the central processing unit(s) in conjunction with central processing unit control programs, the control programs being comprised of instructions resident in the main memory 15. The non-resident data and instructions are typically stored in the mass storage unit and transferred to and from the central processing unit(s) via the system bus 19. Input/output unit(s) {#1} 16 (through {#M} 17) couple devices such as mass memory storage units, user terminal devices and communication devices to the data processing system by means of the system bus 19. The mass storage units store the data and instructions required by the data processing unit(s). Sets of data and/or instructions, typically designated as pages of data and/or instructions, required for the operation of the central processing units 11 through 12, are transferred from the mass storage units, having relatively slow accessibility, to the main memory unit to which access by the central processing unit is relatively fast. The bus oriented system has an advantage in the relative ease to reconfigure the system but has the disadvantage that the each system component requires control apparatus to provide an interface with the system bus 19. Referring next to FIG. 1B, a data processing system is shown in which the central processing unit(s) 11 (through 12) and the input/output unit(s) 16 (through 17) are coupled to the main memory unit 15 through a memory control unit 14, the memory control unit 14 replacing the system bus 19 and the control function performed by the individual data processing system components in the bus oriented configuration of FIG. 1A. The memory control unit 14 provides a centralized control and monitoring of the transfer of data and instructions that can be more efficient than the bus oriented configuration of FIG. 1A, but with the loss of flexibility.

Figure 2:
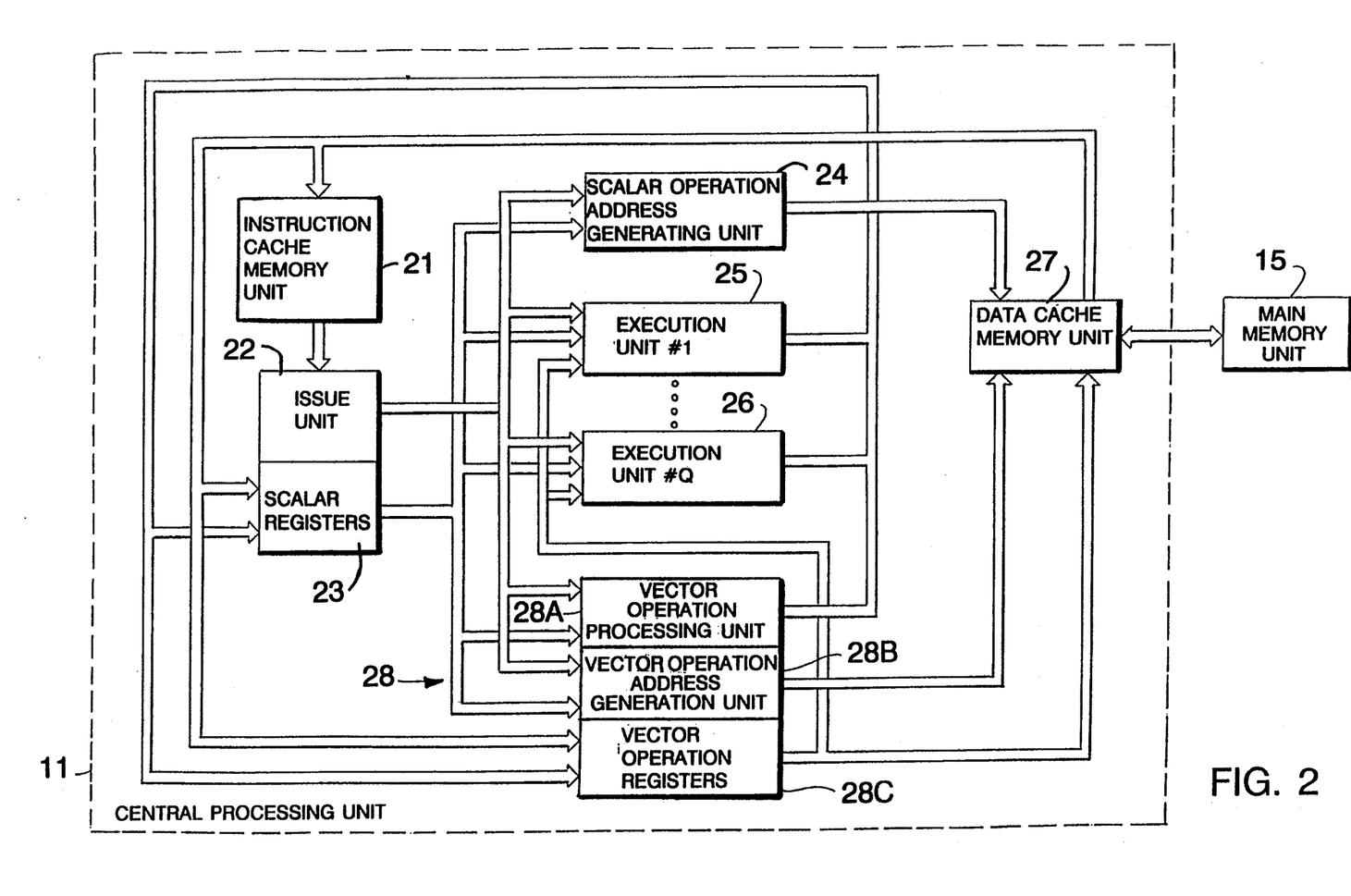
FIG. 2 is an exemplary block diagram of a central processing unit capable of effective utilization of the instant invention.

Referring next to FIG. 2, a block diagram of an exemplary central processing unit capable of effective utilization of the present invention is illustrated. The issue unit 22 is responsible for for providing (decoded) instructions to the plurality of specialized execution units comprising scalar operation address generation unit 24, at least one execution unit (#1) 25 (through execution unit {#Q} 26) and a vector operation unit 28, the vector operation unit including vector operation processing unit 28A, vector operation address generation unit 28B and vector operation registers 28C. The data processed by the execution units are typically extracted from the scalar registers 23 or the vector registers 28C. The resulting data from the execution units are stored in scalar registers 23, in the vector registers 28C or in the data cache memory unit 27. The data cache memory unit 27 can be viewed as a cache memory unit providing an interface between the main memory unit 15 and the central processing unit 11. (The data cache memory unit 27 is shown as being coupled directly to the main memory unit in FIG. 2. As illustrated in FIG. 1A and FIG. 1B, the actual coupling can include intervening data processing apparatus.) The issue unit 22 includes apparatus for determining which execution unit will process selected data and for determining when the selected execution unit is available for processing data. This latter feature includes ascertaining that the destination storage location will be available to store the processed data. The instruction cache memory unit 21 stores the instructions that are decoded and forwarded to the appropriate execution unit by the issue unit 22. The issue unit 22 has the apparatus to attempt to maximize the processing operations of the execution units. Thus, the issue unit 22 includes pre-fetch apparatus and algorithms to insure that the appropriate instruction (including any branch instruction) is available to the issue unit 22 as needed. The plurality of execution units are, as indicated by the scalar operation address generation unit 24 and the vector operation unit 28, specialized processing devices for handling certain classes of processing operations. For example, an execution unit can be configured to handle floating point operations, or integer arithmetic operations, etc. The issue unit 22 has associated therewith scalar registers 23 that can store data required for the execution of the program or for providing a record of the data processing operation. For example, one register is the Program Counter register that stores the (virtual) address of the next instruction, in the executing program instruction sequence, to be processed. The scalar operation address generation unit 24 is used to convert virtual addresses to physical locations in the main memory unit 15. The issue unit 22 is also responsible for reordering the logic signal groups from the execution units in the correct sequence when the execution units process instructions at different rates.

In order to increase the processing speed of the data processing system, the execution units are implemented using pipelined techniques in addition to providing for the parallel execution of multiple instructions. This implementation technique can be understood by reference to FIG. 3 which illustrates features of the pipelining process. The execution unit processing instruction #n in the instruction sequence actually performs the associated operation in five stages, each occupying a time interval of "T". The sum of $T_0$ through $T_4$, i.e., $5 \times$"T", can occupy a time interval to perform the associated operation that can exceed the time interval needed to perform the operation in the same technology, but without the multiplicity of stages. The advantage arising from the pipelined implementation is that an instruction can be completed by the execution unit every "T" time interval. When the "T" time interval is appreciably shorter than the time interval for non-pipelined operation, then an instruction sequence can be executed more rapidly.

Referring again to FIG. 3, when instruction #n is applied to an execution unit performing an arithmetic operation and begins the activity identified by the instruction during time interval $T_0$, after a sequence of suboperations, each occupying a time interval "T", the results of the instruction are available during time interval $T_4$ for the illustrated 5-stage pipelined processor unit. However, during the normal course of operation, the issue unit will apply new instruction #n+1 during time interval $T_1$, instruction #n+2 during time interval $T_2$ and instruction #n+3 during time interval $T_3$, instructions #n+1, #n+2, and #n+3 all being applied to an execution unit, but not necessarily the same execution unit, before the execution unit result for instruction #n and possible arithmetic exception associated therewith is available during time interval $T_4$. To further complicate the processing environment, the different execution units can have different times to complete the execution an instruction (e.g., the number of pipeline stages can be different. Thus, for example, the execution unit result and possible arithmetic exception for instruction #n+2 can be available before the execution unit result and possible arithmetic exception detected for instruction #n.

Figure 4:
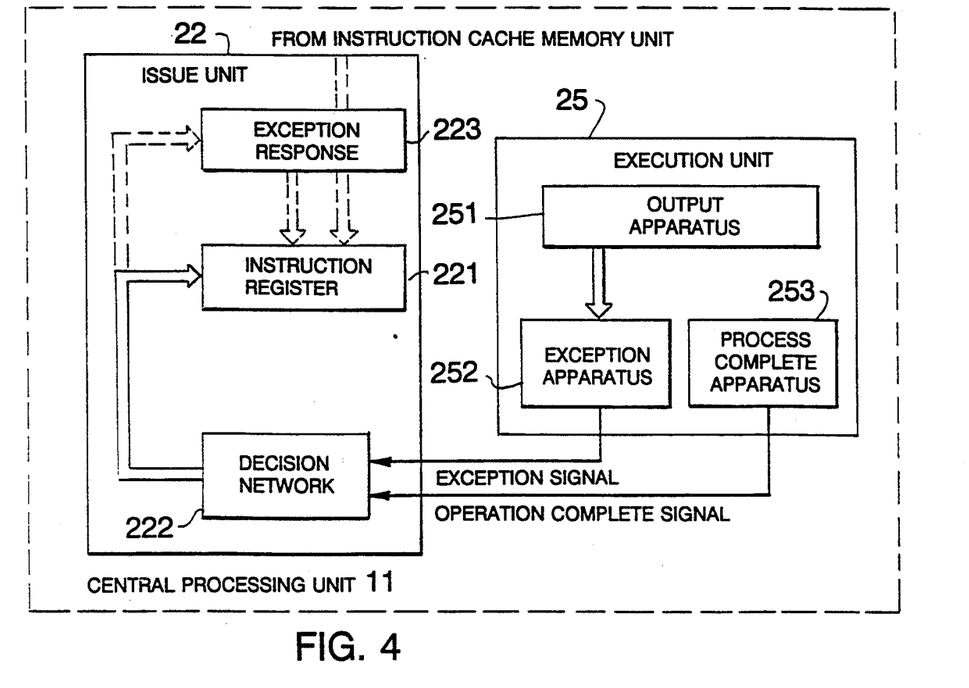
FIG. 4 is a block diagram illustrating the apparatus required to implement the present invention.

Referring next to FIG. 4, the apparatus required to implement the present invention is illustrated. In the issue unit 22, an instruction register 221 is provided in which the current instruction is decoded and applied to the appropriate execution unit. When the DRAIN instruction of the present invention is entered in the instruction register 221, decision network 222 responds to the instruction by preventing the next sequential instruction from being entered into the instruction register 221, not permitting decoding of the next instruction or some other appropriate activity that prevents the issuance of the next instruction until all instructions currently in execution have been completed without identification of an arithmetic exception. In the meantime, each execution unit 25 applies to the (decision network 222) of the issue unit 22 a signal from signal apparatus 253 indicating when any instruction executing in the execution unit is complete. Because the issue unit 22 maintains files of uncompleted execution activity, the issue unit 22 can determine when all activity is complete. In addition, in the execution unit 25, exception apparatus 252 is coupled to the output apparatus 251 of the execution unit 25.

Figure 3:
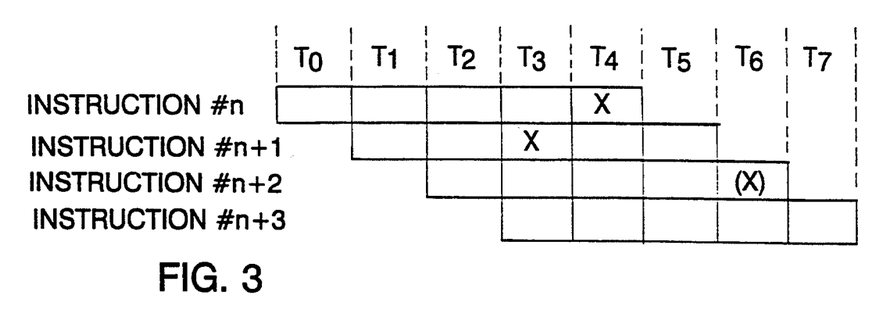
FIG. 3 is a general timing diagram illustrating the complexity of recovering from detection of an arithmetic exception in a multi-execution unit environment.
Figure 5:
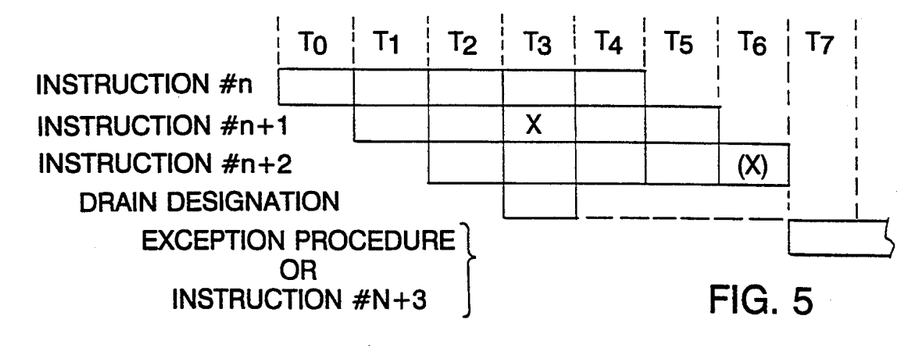
FIG. 5 illustrates the operation of the DRAIN instruction according to the present invention.

Referring next to FIG. 5, instead of instruction #n+3 being applied from the issue unit 22 in time interval $T_3$ as shown in FIG. 3, the DRAIN instruction is applied at this point. Then, in time interval $T_7$, the next instruction is either part of the procedure for responding to the detected arithmetic exception(s) when an exception is detected or the next sequential instruction when no arithmetic exception is detected.

Figure 6A:
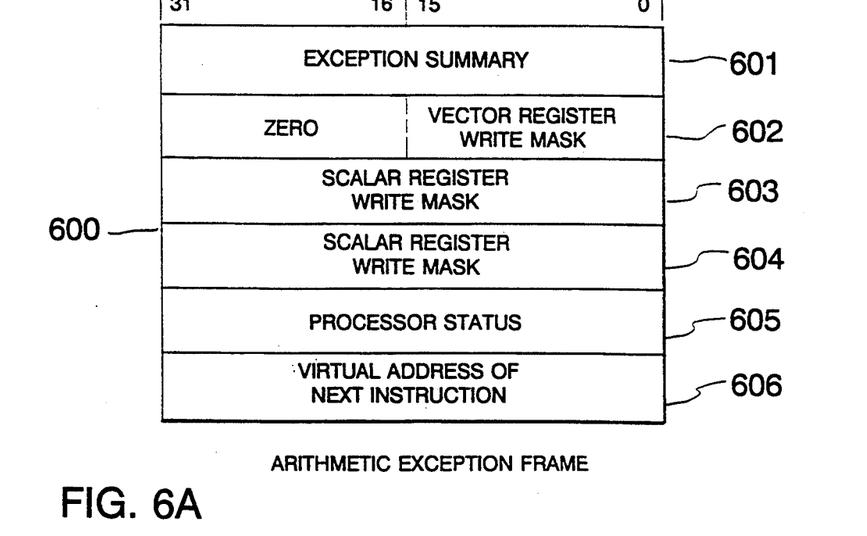
FIGS. 6A, 6B and 6C define the arithmetic exception frame generated as a result of the identification of an arithmetic exception according to the present invention.

Referring next to FIG. 6A, FIG. 6B and FIG. 6C, the arithmetic exception frame generated when an arithmetic exception is identified according to the preferred embodiment is illustrated. In the arithmetic exception frame 600 of FIG. 6A, the first longword (i.e., 4 bytes of logic signals) 601 of the exception frame stores the exception summary information (i.e., from the exception summary register. The contents of this parameter or longword are described below. The second longword 602 stores the vector register write mask, while the longwords 603 and 604 store the scalar register write mask. The register write masks of longwords 602, 603 and 604 identify the register into which were written the results identified as an arithmetic exception. A one-to-one correspondence exists between the position of bits in the mask and registers that can receive the exceptional results. For example, in the preferred embodiment, 64 scalar registers are present and each bit field of longword 604 and 605 is associated with a scalar register, i.e. 0 through 63. The parameter in longword 605 is the processor status (i.e., the contents of the processor status register), which is described below. In longword 606, the virtual address of the next instruction is stored. This address in parameter 606 is the address of the instruction following the DRAIN instruction.

Figure 6B:
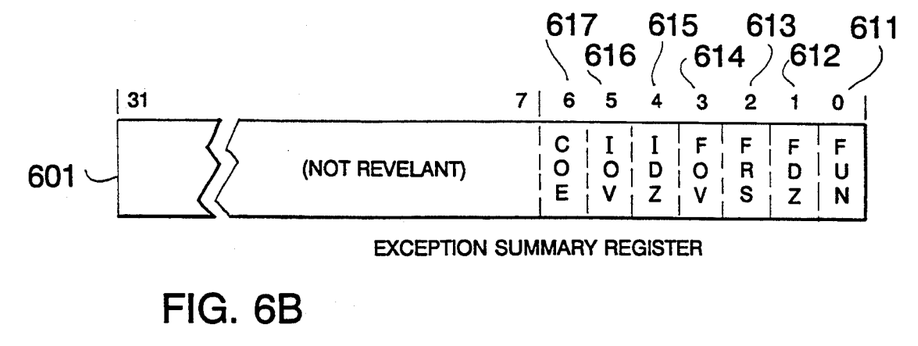

Referring next to FIG. 6B, the definition of the exception summary parameter 601 is shown. The bit 0 position 611, designated FUN in FIG. 6B indicates that a floating point arithmetic or conversion operation underflowed the destination exponent. The bit 1 position 612, FDZ, indicates that a division by zero in a floating point operation was attempted. The bit 2 position 613, FRS, indicates that an attempt was made to perform a floating point arithmetic, conversion, or comparison operation and at least one of the operands was reserved. The bit 3 position 614, FOV, indicates that an attempt to perform an floating point arithmetic or conversion operation resulted in an overflow of the destination exponent. The bit 4 position 615, IDZ, indicates that an attempt was made to perform an integer divide operation with a divisor of zero. The bit 5 position 616, IOV, indicates that an integer arithmetic operation or conversion from floating point format to integer format overflowed the precision available at the destination location. The bit 6 position 617, COE, indicates that a co-processor read or write with a trap enable set was executed when a co-processor exception was identified.

Figure 6C:
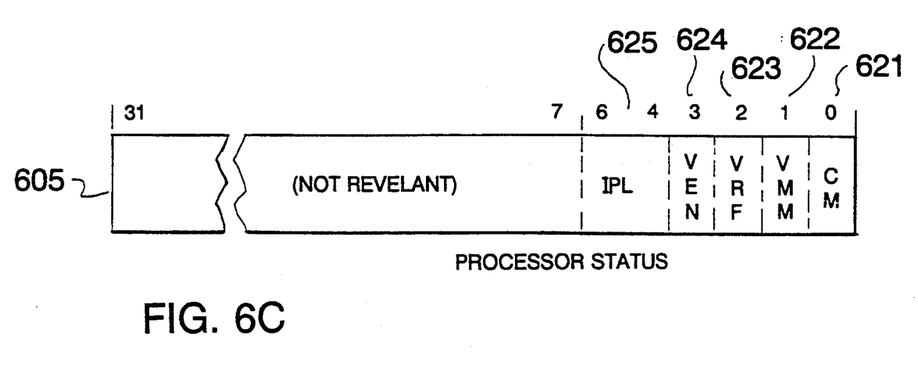

In FIG. 6C, the processor status parameters 605 are identified. For these parameters, bit 0 position 621, CM, indicates the access mode of the currently executing program wherein a "0" logic signal indicates a privileged mode of operation and a "1" logic signal indicates a non-privileged or user mode of operation. The bit 1 position 622, VMM, indicates a processor execution mode that is not directly related to the present invention. The bit 2 position 623, VRF, is set in the processor status parameter when a vector restart frame has been saved during initiation of an exception. The bit 3 position 624, VEN, controls whether vector instructions can be executed. When this position has a signal set therein, vector instructions can issue normally. Otherwise, an attempt to issue a vector instruction will result in a vector operation enable fault. The bit 4–6 positions 624, IPL, define the interrupt priority level for the current processor execution activity.

2. Operation of the Preferred Embodiment

The central processing unit having pipelined execution units of FIG. 2 is implemented in the preferred embodiment subject to several constraints, however, other design implementations can utilize the present invention. The central processing unit includes a plurality of execution units, each execution unit adapted to execute a class of instructions. By way of example, one execution unit, the scalar address generating unit 24, controls the transfer of the logic signal groups between the central processing unit and the main memory unit 15, i.e., executes the load/store instructions. One execution unit can be adapted to execute data signal group shifting operations, one execution unit for floating point add/subtract operations, one execution unit for integer and floating point multiply operations and one execution units for integer and floating point divide operations. The specialized execution units can be, but are not necessarily implemented in a pipelined configuration. The other features of the central processing unit are the following. The instruction in the currently executing sequence of instructions is transferred to the issue unit 22 from the instruction cache memory unit 21. In the issue unit 22, the instruction is broken down into its constituent parts and data-dependent control signals and address signals are generated therefrom. However, before an instruction can begin execution (i.e., be issued), several constraints must be satisfied. All source and destination registers for the instruction must be available, i.e., no write operations to a needed register can be outstanding. The register write path must be available at the future cycle in which this instruction will store the processed quantity. The execution unit to be required for processing the instruction during the execution must be available to perform the operation. With respect to the vector operation unit, a vector operation reserves an execution unit for the duration of the vector operation. When a memory load/store instruction experiences a cache memory unit miss, the load/store unit busy flag will cause the subsequent load/store instructions to be delayed until the cache memory miss response is complete. When an instruction does issue, the destination register and the write path cycle for the result are reserved. During operand set-up, all instruction-independent register addresses are generated, operands are read and stored, and data-dependent control signals are generated. The instruction operands and control signals are passed to the the associated execution unit for execution. The result generated by the execution unit is stored in the register files or in the data cache memory unit 15 as appropriate. Once an instruction issues, the result of the processing may not be available for several machine cycles. Meanwhile, in the next machine cycle, the next instruction can be decoded and can be issued when the requisite issue conditions are satisfied. Thus, the instructions are decoded and issued in the normal instruction sequence, but the results can be stored in a different order because of the varying instruction execution times of the execution units. This out of order storing of the results of the processing operations complicates the exception handling and the retry of failing instructions. However, these events are relatively rare and the out of order storing provides execution and hardware advantages.

The execution of a DRAIN instruction provides that all the instructions, currently in execution in a data processing system will be completed before a next instruction is executed. Therefore, a principal use DRAIN instruction is between changes in the context environment. When all active instructions have been completed, either the next instruction will be issued or an exception procedure will begin execution. This selection ensures that all exceptions generated from previously issued, but uncompleted instructions, are processed in a consistent software environment or processing context.

The presence of an exception indication does not necessarily mean that the data causing the exception condition is defective. The data processing context environment determines whether the data causing the exception condition is defective. This relationship indicates why the processing of an arithmetic exception in the appropriate data processing context environment is important. For example, a program or routine can be in execution for which arithmetic overflows and underflows are an expected result. The presence of an arithmetic exception indicator in this context environment can cause the subroutine or program to scale the data in an attempt to avoid the exceptional condition. However, if the data processing context environment had been altered between the identification of an exception condition and the resulting response, the response to the exception condition can be inappropriate.

In order to facilitate response to the identification of an exception condition, once the instructions in execution are completed, an exception summary mask is developed that identifies the (scalar and vector) registers that have received results that are identified as exceptional, (i.e., results that are not correct because of an exception condition). This summary mask is made available to the privileged operating system software along with the continuation program counter. The summary mask and the contents of the continuation program counter permit operating system exception handling software to identify the instructions resulting in the exception conditions.

It will be clear to those skilled in the art of data processing system design that the DRAIN instruction (and the apparatus implementing execution of the DRAIN instruction) can be used to verify hardware implementation of data processing system circuit designs and can be used to assist in the verification of software programs. The DRAIN instruction can be inserted in the executing program instruction sequence immediately following instructions for which a problem is anticipated. In this manner, the results of the instruction sequence to the location of the DRAIN instruction can be verified. High level programming language compilers can use the DRAIN instruction when the program is compiled for debugging. In this application, the DRAIN instruction is positioned between groups of program instructions that comprise the translation of the high level language statement. When the instruction sequence generates an exception condition, the verification (debugging) procedure can identify the statement in the source program that resulted in an exception condition.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing unit for executing a sequence of instructions, said data processing unit comprising:
   A. a memory unit for storing said sequence of instructions;
   B. an execution unit for iteratively processing instructions in said sequence that are transferred thereto and for signalling an exception if an exception event occurs during processing of said instructions; and
   C. an issue unit comprising
      1) an instruction transfer portion for iteratively acquiring instructions in said sequence from said memory unit and selectively transferring said instructions to said execution unit for processing, said sequence of instructions stored in said memory unit including at least one predetermined instruction adapted to cause the transfer of subsequent instructions to said execution unit to be temporarily suspended until said execution unit completes said processing of instructions previously transferred thereto without signalling that a said exception event has occurred, and 2) an inhibiting portion responsive to the acquisition by said instruction transfer portion of said predetermined instruction for inhibiting said instruction transfer portion from transferring further said instructions to said execution unit independently of whether said execution unit has signalled that said exception event has occurred, thereby to temporarily suspend said execution at least until said execution unit completes said processing of instructions previously transferred thereto, and for permitting said instruction transfer portion to resume transferring said instructions if results of said processing of said previously transferred instructions indicate that said exception event has not occurred.

2. A data processing unit as defined in claim 1 wherein one of said results is an operation complete indication that said execution unit is adapted to generate in response to termination of processing of each instruction, said issue unit further including a disabling portion responsive to a receipt of said operation complete indication for disabling said inhibiting portion to thereafter permit said instruction transfer portion to resume transferring instructions to said execution unit.

3. A data processing unit as defined in claim 2 wherein said instructions comprise two instruction streams, including a program instruction stream and an exception handling instruction stream, said instruction transfer portion including an exception response portion for normally acquiring instructions from said program instruction stream, and responsive to the receipt of an exception indication from any execution unit for thereafter acquiring instructions from said exception handling instruction stream for transfer to said execution unit.

4. A data processing unit as defined in claim 3 wherein said exception response portion further includes a context storage portion for storing context information prior to acquiring instructions from said exception handling instruction stream for transfer to said execution unit.

5. The data processing unit of claim 1 wherein one of said results is an exception indication that said execution unit is adapted to generate in response to the occurrence of an exception event during said processing of said instructions, said inhibiting portion determining to allow said instruction transfer portion to resume said transferring of said instructions if said execution unit completes said processing of said previously transferred instructions without generating said exception indication.

6. The data processing unit of claim 5 wherein said inhibiting portion is adapted to respond to said exception indication from said execution unit by continuing to inhibit said instruction transfer portion from transferring said instructions after said execution unit completes said processing of said previously transferred instructions.

7. The data processing unit of claim 1 further comprising a plurality of execution units each iteratively processing said instructions in said sequence that are transferred thereto by said instruction transfer portion, said inhibiting portion being adapted to be further responsive to said predetermined instruction to:

inhibit said instruction transfer portion from transferring said instructions to said execution units at least until all of said execution units complete said processing of instructions previously transferred thereto, and determine whether to permit said instruction transfer portion to resume transferring said instructions to said execution units based on results of said processing of said previously transferred instructions.

8. A data processing unit as defined in claim 7 wherein one of said results is an exception indication that said execution units are adapted to generate in response to the occurrence of an exception event during said processing of said instructions, said inhibiting portion determining to allow said instruction transfer portion to resume said transferring of said instructions to all of said execution units if said execution units complete said processing of said previously transferred instructions without generating said exception indication.

9. A data processing unit as defined in claim 8 wherein one of said results is an operation complete indication that said execution units are adapted to generate in response to termination of processing of each instruction, and said issue unit further includes a disabling portion which receives operation complete indications from all of said execution units, said disabling portion disabling said inhibiting portion in response to the receipt of said operation complete indication from all of the execution units currently processing instructions to thereafter permit said instruction transfer portion to resume transferring instructions to said execution units.

10. The data processing unit of claim 8 wherein said inhibiting portion is adapted to respond to said exception indications from said execution units by continuing to inhibit said instruction transfer portion from transferring said instructions after said execution units complete said processing of said previously transferred instructions.

11. A data processing unit as defined in claim 9 wherein said issue unit maintains unfinished instruction information identifying instructions that have been transferred to an execution unit but for which processing has not been completed, said disabling portion using said unfinished instruction information in determining whether it has received an operation complete indication from all of the execution units currently processing instructions.

12. A data processing unit as defined in claim 11 wherein said instructions comprise two instruction streams, including a program instruction stream and an exception handling instruction stream, said issue unit including an exception response portion for normally acquiring instructions from said program instruction stream, and responsive to the receipt of an exception indication from any execution unit for thereafter acquiring instructions from said exception handling instruction stream for transfer to an execution unit.

13. A data processing unit as defined in claim 12 wherein said exception response portion further includes a context storage portion for storing context information prior to acquiring instructions from said exception handling instruction stream for transfer to an execution unit.

14. A data processing unit for executing a sequence of instructions, said data processing unit comprising:
   A. a memory unit for storing a plurality of instruction streams, including a program instruction stream and an exception handling instruction stream;
   B. a plurality of execution units each for iteratively processing instructions in said sequence and for signalling an exception if an exception event occurs during processing of said instructions; and
   C. an issue unit comprising:
      i. an instruction acquisition portion for iteratively acquiring instructions in said sequence from said plurality of instruction streams stored in said memory unit, said instruction acquisition portion including an exception response portion for normally acquiring instructions from said program instruction stream, and responsive to the receipt from any execution unit of a signal that said exception event has occurred for thereafter acquiring instructions from said exception handling instruction stream;
      ii. an instruction transfer portion for selectively transferring the instructions acquired by said instruction acquisition portion to said execution units for processing, said plurality of instruction streams stored in said memory unit including at least one predetermined instruction adapted to cause the transfer of subsequent instructions to said execution units to be temporarily suspended until said execution units complete said processing of instructions previously transferred thereto without signalling that a said exception event has occurred;
      iii. an inhibiting portion responsive to the acquisition by said instruction transfer portion of said predetermined instruction for inhibiting said instruction transfer portion from transferring further said instructions to said execution units independently of whether said execution units have signalled that a said exception event has occurred, thereby to temporarily suspend said execution at least until said execution units complete said processing of instructions previously transferred thereto; and
      iv. a disabling portion, responsive to said execution units completing said processing of said previously transferred instructions without signalling that a said exception event has occurred, for disabling said inhibiting portion to thereafter permit said instruction transfer portion to resume transferring instructions to said execution units.

15. A method of operating a data processing unit for iteratively processing instructions in a sequence of instructions that are transferred from a memory unit to said data processing unit by an issue unit, said data processing unit including an execution unit for processing said instructions and for signalling an exception if an exception event occurs during processing to said instructions, said method comprising causing the issue unit to:
   A. iteratively acquire instructions in said sequence from said memory unit, said sequence including at least one predetermined instruction adapted to cause the transfer of subsequent instructions to said execution unit to be temporarily suspended until processing of instructions previously transferred to said execution unit has completed without said execution unit signalling the occurrence of a said exception event;
   B. determine for each acquired instruction whether the instruction is said predetermined instruction, and, if the acquired instruction is not said predetermined instruction, transfer the instruction to said execution unit for processing;
   C. respond to said predetermined instruction by inhibiting transfers of other instructions in said sequence to said execution unit independently of whether said execution unit has signalled that said exception event has occurred, thereby to temporarily suspend said processing at least until said execution unit completes processing of instructions previously transferred thereto; and
   D. determine to resume said transfers of said instructions if results of said processing of said previously transferred instructions indicate that said exception event has occurred.

16. A method as defined in claim 15 wherein one of said results is an operation complete indication that said execution unit is adapted to generate in response to termination of processing of each instruction, said issue unit further resuming transfer of instructions to said execution unit upon receipt of said operation complete indication.

17. A method as defined in claim 16 wherein said instructions comprise two instruction streams, including a program instruction stream and an exception handling instruction stream, said issue unit normally acquiring instructions from said program instruction stream, and responsive to the receipt of an exception indication from any execution unit for thereafter acquiring instructions from said exception handling instruction stream for transfer to said execution unit.

18. A method as defined in claim 17 wherein said exception response portion further includes a context storage portion for storing context information prior to acquiring instructions from said exception handling instruction stream for transfer to said execution unit.

19. The method of claim 15 wherein one of said results is an exception indication that said execution unit is adapted to generate in response to the occurrence of an exception event during said processing of said instructions, said issue unit determining to resume said transferring of said instructions after said execution unit completes said processing of said previously transferred instructions.

20. The method of claim 19 wherein said issue unit responds to said exception indication from said execution unit by continuing to inhibit said transfers of said instructions after said execution unit completes said processing of said previously transferred instructions.

21. The method of claim 15 wherein said data processing unit further comprises a plurality of execution units each iteratively processing said instructions in said sequence that are transferred thereto by said issue unit, said issue unit being further responsive to said predetermined instruction to:
   inhibit transfers of said instructions to said execution units at least until all of said execution units complete said processing of instructions previously transferred thereto, and
   determine whether to resume said transfers of said instructions to said execution units based on results of said processing of said previously transferred instructions.

22. A method as defined in claim 21 wherein one of said results is an exception indication that said execution units are adapted to generate in response to the occurrence of an exception event during said processing of said instructions, said issue unit determining to resume said transfers of said instructions to all of said execution units if said execution units complete said processing of said previously transferred instructions without generating said exception indication.

23. A method as defined in claim 22 wherein one of said results is an operation complete indication that said execution unit is adapted to generate in response to termination of processing of each instruction, said issue unit further resuming transfer of instructions to said execution unit upon receipt of said operation complete indication from all of said execution units currently processing instructions.

24. The method of claim 22 wherein said issue unit responds to said exception indications from said execution units by continuing to inhibit said transfers of said instructions after said execution units complete said processing of said previously transferred instructions.

25. A method as defined in claim 23 wherein said issue unit maintains unfinished instruction information identifying instructions that have been transferred to an execution unit but for which processing has not been completed, said issue unit using said unfinished instruction information in determining whether it has received an operation complete indication from all of the execution units currently processing instructions.

26. A method as defined in claim 25 wherein said instructions may comprise two instruction streams, including a program instruction stream and an exception handling instruction stream, said issue unit normally acquiring instructions from said program instruction stream, and responsive to the receipt of an exception indication from any execution unit for thereafter acquiring instructions from said exception handling instruction stream for transfer to an execution unit.

27. A method as defined in claim 26 wherein said issue unit further includes a context storage portion that storing context information prior to acquiring instructions from said exception handling instruction stream for transfer to an execution unit.

* * * * *